(12) United States Patent
Takeda et al.

(10) Patent No.: US 7,124,232 B2
(45) Date of Patent: Oct. 17, 2006

(54) BUS CONNECTION CIRCUIT AND BUS CONNECTION SYSTEM HAVING PLURAL REQUEST QUEUES, A BUS INTERFACE PORTION OUTPUTTING REQUEST SIGNALS, AN ARBITER PERFORMING ARBITRATION OF PLURAL REQUESTS AND A BUS INTERFACE PORTION OUTPUTTING A REQUEST SIGNAL INDICATING ALLOCATION OF PRE-FETCH BUFFERS CORRESPONDING TO ARBITRATED REQUESTS

(75) Inventors: Yoshihiko Takeda, Kawasaki (JP); Kentarou Yuasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 10/780,607

(22) Filed: Feb. 19, 2004

(65) Prior Publication Data
US 2004/0225822 A1    Nov. 11, 2004

(30) Foreign Application Priority Data
May 8, 2003    (JP) .............................. 2003-129840

(51) Int. Cl.
*G06F 13/36* (2006.01)
(52) U.S. Cl. ...................... 710/310; 710/309; 710/52
(58) Field of Classification Search ........ 710/309–315, 710/111–113, 36–39, 7–8, 52–54, 240–241; 711/167–169
See application file for complete search history.

(56) References Cited

U.S. PATENT DOCUMENTS

| | | | | |
|---|---|---|---|---|
| 5,168,570 A | * | 12/1992 | Eckert et al. ............... | 710/241 |
| 5,761,710 A | | 6/1998 | Igami et al. | |
| 5,905,876 A | * | 5/1999 | Pawlowski et al. ......... | 710/112 |
| 5,933,610 A | * | 8/1999 | Chambers et al. .......... | 711/113 |
| 6,272,582 B1 | | 8/2001 | Streitenberger et al. | |
| 6,502,157 B1 | * | 12/2002 | Batchelor et al. ........... | 710/310 |
| 6,594,730 B1 | * | 7/2003 | Hum et al. .................. | 711/137 |
| 6,629,220 B1 | * | 9/2003 | Dyer ........................... | 711/158 |
| 6,694,397 B1 | * | 2/2004 | Lackey et al. .............. | 710/112 |
| 6,898,649 B1 | * | 5/2005 | Goudie ........................ | 710/112 |
| 6,970,978 B1 | * | 11/2005 | Wu .............................. | 711/137 |

FOREIGN PATENT DOCUMENTS

| | | |
|---|---|---|
| JP | 8-314639 | 11/1996 |
| JP | 11-238030 | 8/1999 |

* cited by examiner

*Primary Examiner*—Mark H. Rinehart
*Assistant Examiner*—Raymond N Phan
(74) *Attorney, Agent, or Firm*—Staas & Halsey LLP

(57) ABSTRACT

A bus connection circuit is connected by a bus to a bridge circuit having a plurality of pre-fetch buffers to access memory. A plurality of request queues and a plurality of request signal outputs and grant signal inputs are provided in a single bus connection device. By means of the single bus connection device, a plurality of pre-fetch buffers of a bridge circuit can be utilized effectively, wasted read requests corresponding to retry responses from the bridge circuit can be decreased, and consequently wasted use of a PCI bus can be reduced.

16 Claims, 11 Drawing Sheets

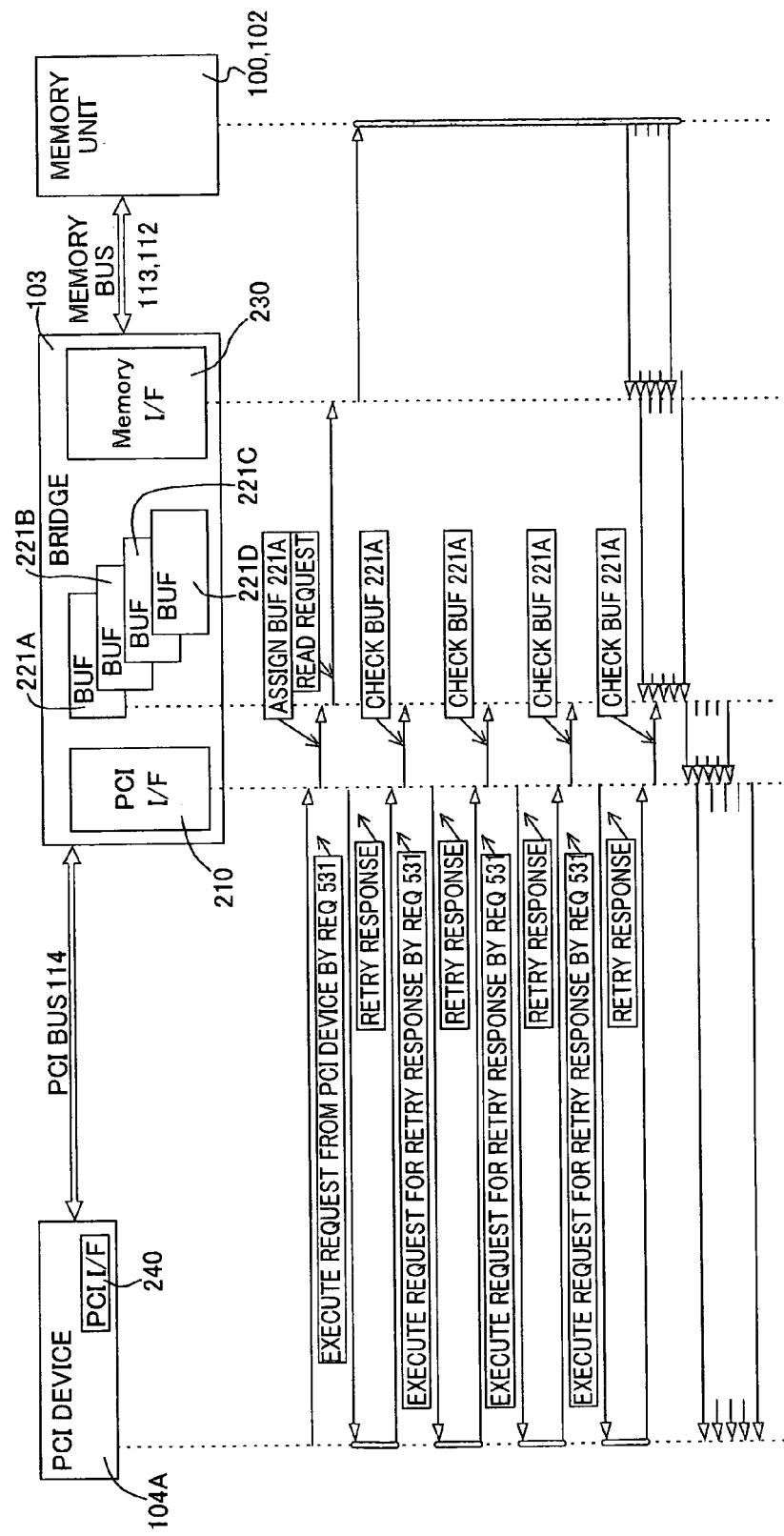

BUS CONNECTION CIRCUIT AND BUS CONNECTION SYSTEM HAVING PLURAL REQUEST QUEUES, A BUS INTERFACE PORTION OUTPUTTING REQUEST SIGNALS, AN ARBITER PERFORMING ARBITRATION OF PLURAL REQUESTS AND A BUS INTERFACE PORTION OUTPUTTING A REQUEST SIGNAL INDICATING ALLOCATION OF PRE-FETCH BUFFERS CORRESPONDING TO ARBITRATED REQUESTS

CROSS-REFERENCE TO RELATED APPLICATIONS

This application is based upon and claims the benefit of priority from the prior Japanese Patent Application No. 2003-129840, filed on May 8, 2003, the entire contents of which are incorporated herein by reference.

BACKGROUND OF THE INVENTION

1. Field of the Invention

This invention relates to a bus connection circuit and bus connection system utilizing data pre-fetch functions in a computer system requiring high-speed and large-volume data transfer, and in particular relates to a bus connection circuit and bus connection system utilizing data pre-fetch functions to raise the efficiency of transfer of large volumes of data, in a computer system having an internal PCI bus.

2. Description of the Related Art

In recent years computer systems have widely adopted PCI (Peripheral Component Interconnect) buses as a standard bus specification capable of high-speed transfer of large amounts of data. PCI is a bus standard advocated by U.S. Intel Corporation; specifications for this standard have been developed and published by the PCI Special Interest Group (PCI SIG), an industry association in the U.S. A PCI bus is used in particular to connect an I/O device and memory via a chipset, and is useful for speeding the transfer of data between the I/O devices and the memory.

FIG. 7 is a block diagram of a computer system using a PCI bus, and shows a computer system comprising a CPU 101, memory controller 100, memory 102, bridge circuit 103, and PCI devices 104A and 104B. The PCI devices 104A and 104B are connected to the bridge circuit 103 by the PCI bus 114, and the CPU 101, the memory 102 and the bridge circuit 103 are connected to the memory controller 100 by the processor bus 111, the memory bus 112, and the memory controller bus 113, respectively.

The PCI devices 104A and 104B can access the memory 102 via the bridge circuit 103 and the memory controller 100. The bridge circuit 103 performs connection operations to absorb differences in bus data rates, protocols and similar between the memory control bus 113 and the PCI bus 114.

Because data transfer via this bridge circuit 103 may impede the high-speed operation of the PCI bus, in order to raise throughput, a plurality of pre-fetch buffers are provided in the bridge circuit 103 (for example, Japanese Patent Laid-open No. 11-238030).

FIG. 8 is a drawing of the configuration of a computer system comprising a conventional bridge circuit 103 in which is provided a pre-fetch buffer. This computer system comprises a plurality of PCI devices 104A through 104D, a bridge circuit 103, and memory units 100 and 102. The PCI devices 104A to 104D and the memory units 100, 102 are connected by the PCI bus 114 and by the memory buses 113, 112 respectively to the bridge circuit 103.

The bridge circuit 103 has a PCI interface circuit 210, a plurality of pre-fetch buffers 221A to 221D corresponding to each of the PCI devices 104A to 104D, and a memory interface circuit 230. The PCI devices 104A to 104D each have a PCI interface circuit 240, which has a set of a REQ signal and a GNT signal.

FIG. 9 explains the sequence of operations in the computer system of FIG. 8 when a plurality of PCI devices execute memory-read requests; these operations are explained in detail below.

(1) When the PCI device 104A executes a memory read request from internal circuitry, the PCI device 104A uses a request signal REQ 331A to send a request to the PCI bus 114.

(2) The PCI interface portion 240 of the PCI device 104A, on receiving a grant signal GNT 332A from the bridge circuit 103, initiates a memory read request transaction according to the PCI bus protocol.

(3) The PCI interface portion 210 of the bridge circuit 103, on receiving the memory read request, assigns a pre-fetch buffer 221A corresponding to REQ 331A/GNT 332A, and issues a retry response to the PCI bus 114.

(4) On receiving the retry response, the PCI device 104A temporarily releases the PCI bus 114, so that another PCI device can use the PCI bus 114.

(5) The pre-fetch buffer 221A assigned as described above issues a memory read request to perform memory reading to the memory interface portion 230.

(6) The memory interface portion 230 initiates a memory read request transaction with the memory units 100 and 102.

(7) Read data is transferred from the memory units 100 and 102; and is stored in the pre-fetch buffer 221A assigned as described above.

The PCI devices 104B to 104D execute memory read requests similarly to the operations (1) through (7) above. Normally, after the memory interface portion 230 of the bridge circuit 103 executes a memory read, an extremely long time elapses before the read data is received, and so the operations (1) through (7) performed by each of the PCI devices 104A to 104D overlap with a time difference.

(8) Through operations similar to (1) through (3), the PCI device 104A executes a memory read request to the bridge circuit 103.

(9) The PCI interface portion 210 of the bridge circuit 103, on receiving the memory read request, confirms the pre-fetch buffer 221A corresponding to the REQ 331A/GNT 332A used by the request, and when read data is stored therein, initiates data transfer to the PCI bus 114.

Through operations similar to (8) and (9), the PCI devices 104B to 104D also execute memory read requests to the bridge circuit 103 and initiate read data transfer.

As described above, by using pre-fetch buffers, the PCI bus can be used effectively and the overall system throughput is improved.

Thus in the technology of the prior art, by preparing a plurality of pre-fetch buffers in the bridge circuit, high-speed memory access is possible through time-division of the PCI bus among a plurality of PCI devices. However, depending on the circuit configuration, there may be cases in which the number of PCI devices connected to the PCI bus may be smaller than the number of pre-fetch buffers.

For example, as shown in FIG. 10, there is the case of a computer system comprising a single PCI device 104A, a bridge circuit 103, and memory units 100 and 102. Here, the PCI device 104A and the memory units 100 and 102 are connected to the bridge circuit 103 via a PCI bus 114 and memory buses 113 and 112, respectively. The bridge circuit 103 has a plurality of pre-fetch buffers 221A to 221D. Further, the PCI device 104A has one set of REQ/GNT signals.

FIG. 11 explains the sequence of operations in the computer system of FIG. 10 when the PCI device 104A executes a memory read request; operations are indicated in detail below.

(1) When the PCI device 104A executes a memory read request, the PCI device 104A uses REQ 531 to send a request to the PCI bus 114.

(2) The PCI interface portion 240 of the PCI device 104A, on receiving a GNT 532 signal from the bridge circuit 103, initiates a memory read request transaction according to the PCI bus protocol.

(3) The PCI interface portion 210 of the bridge circuit 103, on receiving the-memory read request, assigns a pre-fetch buffer 221A corresponding to REQ 531/GNT 532, and issues a retry response to the PCI bus 114.

(4) On receiving the retry response, the PCI device 104A temporarily releases the PCI bus 114.

(5) The pre-fetch buffer 221A assigned as described above issues a memory read request to perform memory reading to the memory interface portion 230.

(6) The memory interface portion 230 initiates a memory read request transaction with the memory units 100 and 102.

(7) The PCI device 104A again executes a memory read request to the bridge circuit 103, similarly to the actions (1) to (3).

(8) The PCI interface portion 210 of the bridge circuit 103, on receiving a memory read request, confirms the pre-fetch buffer 221A corresponding to the REQ 531/GNT532 used by the request, and because read data is not yet stored therein, sends a retry response to the PCI bus 114.

(9) When the PCI device 104A, on receiving the retry response, temporarily releases the PCI bus 114. The operations (7) through (9) are repeated several times.

(10) Read data is transferred from the memory units 100 and 102, and is stored in the pre-fetch buffer 221A assigned as described above.

(11) The PCI device 104A executes a memory read request to the bridge circuit 103, similarly to the operations (1) to (3).

(12) On receiving the memory read request, the PCI interface portion 210 of the bridge circuit 103 confirms the pre-fetch buffer 221A corresponding to the REQ 531/GNT532 used by the request, and when read data is stored therein, initiates data transfer to the PCI bus 114.

In this way, when only one PCI device is connected, only one pre-fetch buffer is used corresponding to REQ/GNT, and so the PCI device can only execute one memory read request at a time.

Consequently the time from when the PCI device sends a memory read request and the bridge circuit returns a retry response until read data is stored in the pre-fetch buffer is a time of merely repeating read requests prompted by retry responses, and is completely wasted, so that overall system throughput is lowered.

Moreover, normally the time from execution of a memory read by the memory interface portion of the PCI bus until data is received is extremely long, so that even if a memory read request is again executed immediately after a retry response, the bridge circuit merely sends a retry response to the PCI bus once again, and the PCI bus is used wastefully, so that overall system throughput is lowered.

Further, when a PCI device is prompted for a memory read request through a retry response from the bridge circuit simultaneously with an initial memory read request, and the memory read request for the retry response obtains PCI bus use privileges and a memory read request transaction is initiated, because there is a large possibility that read data is not stored in the pre-fetch buffer of the bridge circuit as explained above, the PCI bus is used wastefully, and there is a high probability that overall system throughput will be lowered.

SUMMARY OF THE INVENTION

Hence an object of this invention is to provide a bus connection circuit and bus connection system to enable effective utilization of pre-fetch buffers, even when the number of bus connection devices is fewer in number than the number of the plurality of pre-fetch buffers in the bridge circuit, and to improve system throughput.

A further object of this invention is to provide a bus connection circuit and bus connection system which, by reducing wasteful read requests prompted by retry responses from a bridge circuit, reduce wasted use of the bus and improve the efficiency of data transfer.

In order to achieve these objects, a bus connection circuit of this invention is connected via a bus to a bridge circuit having a plurality of pre-fetch buffers to pre-fetch data from an external device, receives data from the above pre-fetch buffers after request assertion, and has a plurality of request queues, an arbiter which performs arbitration of requests from the above plurality of request queues, and a bus interface portion which outputs a request signal indicating allocation of the above pre-fetch buffers corresponding to requests arbitrated by the above arbiter and which receives corresponding grant signals from the above bridge circuit.

Further, a bus connection system of this invention has a bridge circuit having a plurality of pre-fetch buffers for pre-fetching of data from memory, and a bus connection circuit, connected to the above bridge circuit via a bus, which after request assertion receives data from the above pre-fetch buffers. And the above bus connection circuit has a plurality of request queues, an arbiter which performs arbitration of requests from the above plurality of request queues, and a bus interface portion which outputs a request signal indicating allocation of the above pre-fetch buffers corresponding to requests arbitrated by the above arbiter and which receives corresponding grant signals from the above bridge circuit.

By means of this invention, a plurality of request queues and a plurality of request signal outputs and grant signal inputs are provided in a single bus connection device, so that through a single bus connection device, the plurality of pre-fetch buffers in a bridge circuit can be used effectively, and wasteful read requests prompted by retry responses from the bridge circuit can be reduced, so that wasteful use of the PCI bus can be decreased. As a result, the data transfer efficiency can be raised, and the overall system throughput can be improved.

In this invention, it is preferable that the above bus interface portion release the above bus through the above request signal according to reception of a retry response from the above bridge circuit in reply to the above request signal, and output to the above bus a request signal indicating the allocation of other pre-fetch buffers. As a result, a single bus connection circuit can send requests to the bridge circuit in order, and throughput can be improved.

In this invention, it is preferable that the above request queue perform assertions giving priority to an initial read request over a read request prompted by a retry response as described above. As a result, assertion of other requests can be given priority in the bridge circuit over requests prompted by retry responses, so that the bus can be used more effectively.

Further, in this invention it is preferable that the above request queues each have a register which sets the time from receipt of the above retry response to assertion of the read request corresponding to the above retry response. As a result, the time until a read request for a retry response can be set freely according to the system.

Further, in this invention it is preferable that the bus connection circuit further have an internal circuit which issues read requests to said plurality of request queues. As a result, processing is easy even when read requests are issued in order from the internal circuit.

Further, in this invention it is preferable that the above requests be read requests to memory via the above bridge circuit. As a result, the efficiency of read transfers of large volumes of data can be improved.

Further, in this invention it is preferable that the above bus is a PCI bus. As a result, the performance of a PCI bus capable of high-speed transfer can be achieved.

BRIEF DESCRIPTION OF THE DRAWINGS

FIG. 11 shows the read request sequence of the conventional PCI device of FIG. 10.

DESCRIPTION OF THE PREFERRED EMBODIMENTS

Below, embodiments of this invention are explained in the order of a bus connection system comprising a bus connection circuit, memory read operation using a bus, and other embodiments.

Bus Connection System

Figure 1:
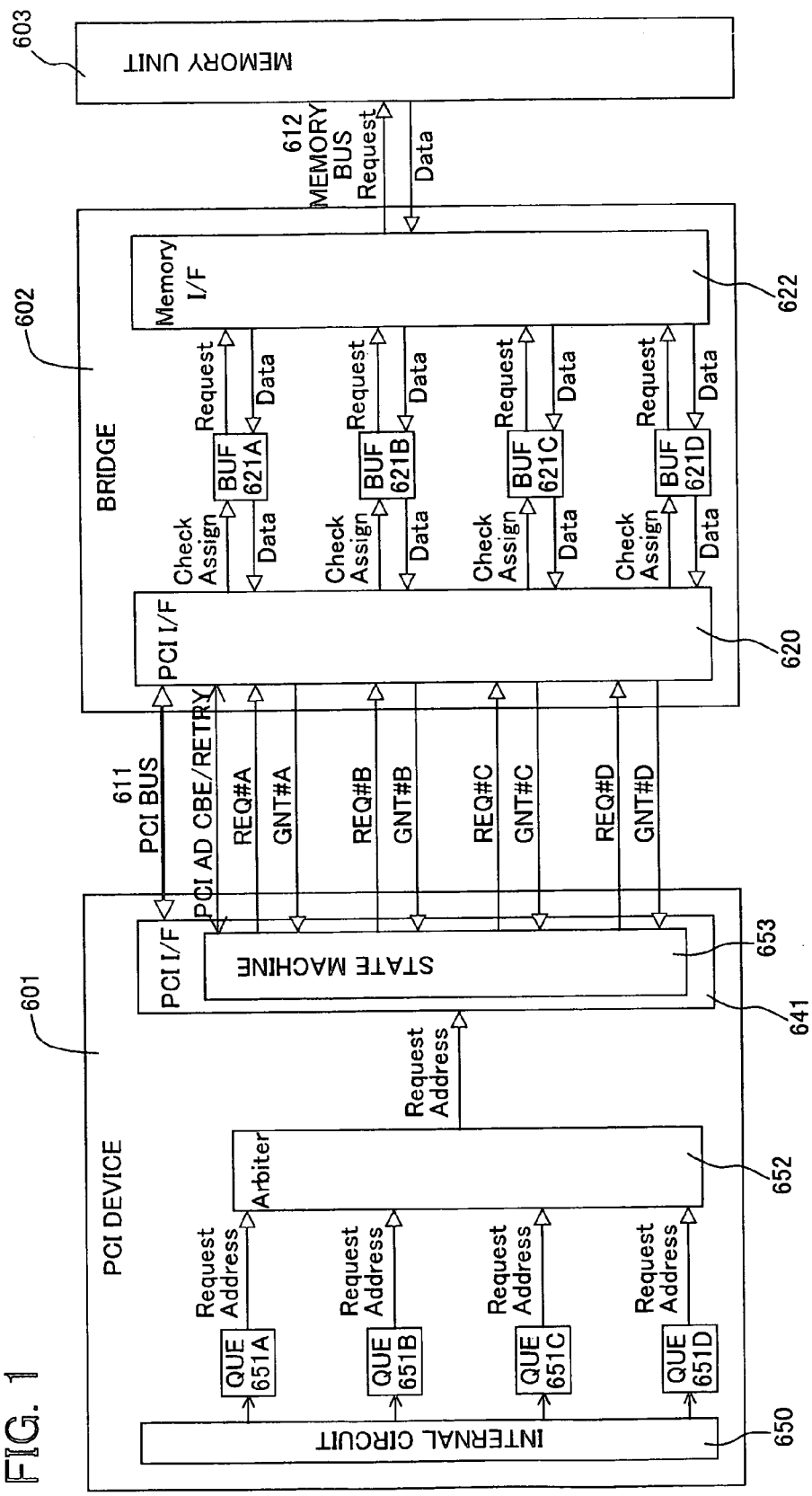
FIG. 1 is a block diagram of the computer system of an embodiment of this invention.

FIG. 1 shows the configuration of a computer system comprising a PCI device, in an embodiment of this invention. As shown in FIG. 1, the PCI device 601 has an internal circuit 650, four read request queues 651A to 651D, an arbiter 652, and a PCI interface portion 641.

This PCI device 601 is connected to the bridge circuit 602 via the PCI bus 611 and the four REQ/GNT lines and response lines. Also, the memory unit 603 is connected to the bridge circuit 602 by the memory bus 612. The bridge circuit 602 has a PCI interface circuit 620, four pre-fetch buffers 621A to 621D, and a memory interface circuit 622.

Each of the four read request queues 651A to 651D of the PCI device 601, upon receiving a read request from the internal circuit 650 of the PCI device 601, sends the read request to the arbiter 652.

The arbiter 652 performs arbitration of the read request queues 651A to 651D, and sends a read request from one to the PCI interface portion 641. The state machine 653 provided within the PCI interface portion 641 asserts a REQ# signal on the request line corresponding to the read request queue among the plurality of requests REQ# on the PCI bus 611.

Figure 2:
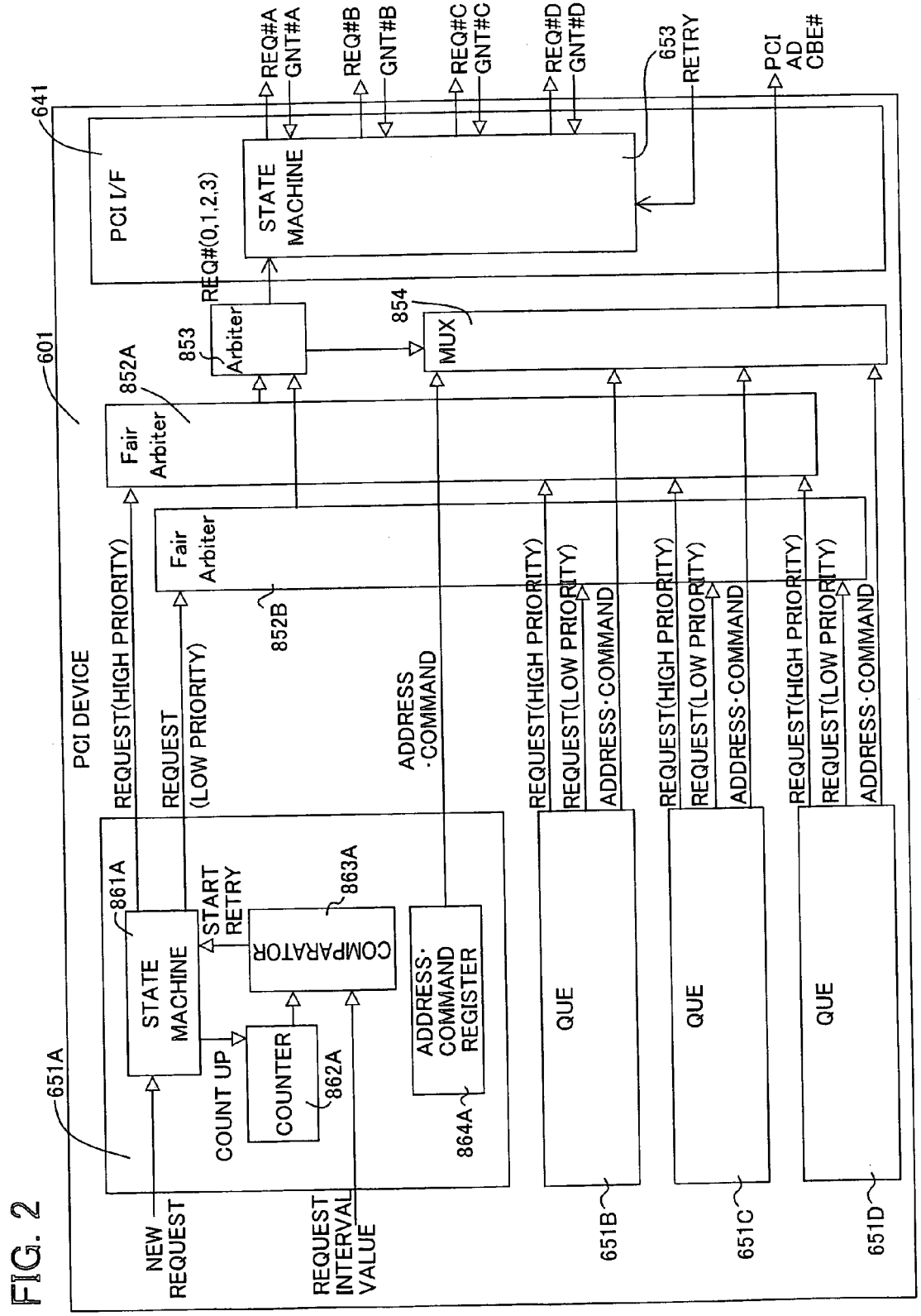
FIG. 2 is a block diagram of the PCI device of FIG. 1.
Figure 3:
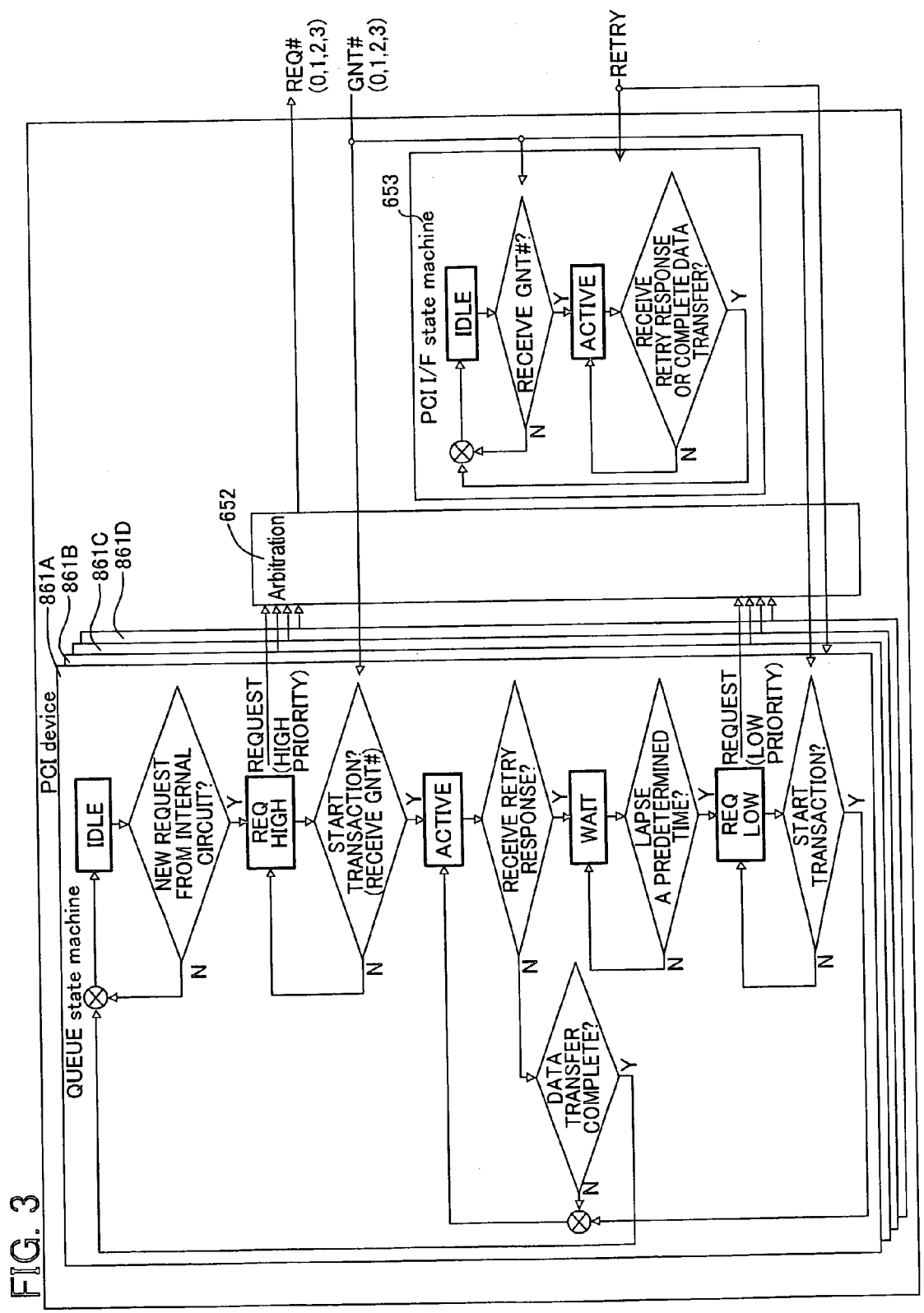
FIG. 3 shows the flow of processing of the state machine of the PCI device of FIG. 1.

The configuration of the PCI device 601 of FIG. 1 is explained in further detail, referring to FIG. 2 and FIG. 3. As shown in FIG. 2, the read request queues 651A to 651D of the PCI device 601 respectively comprise state machines 861A to 861D which store the request state; counters 862A to 862D which count the interval at which the read request queue sends arbitration requests; comparators 863A to 863D which detect the fact that the counter value has exceeded a preset value; and registers 864A to 864D which hold addresses, commands, and other information.

The arbiter 652 comprises a first arbitration circuit 852A, which performs arbitration between high-priority read requests from the request queues 651A to 651D; a second arbitration circuit 852B, which performs arbitration between low-priority read requests; a third arbitration circuit 853, which performs arbitration between the outputs of the first and second arbitration circuits 852A and 852B with a fixed order of priority; and a multiplexer 854 which selects the request information (address command) from the selected read request queue.

When there is a high-priority read request and a low-priority read request, the third arbitration circuit 853 always asserts the high-priority read request.

The PCI interface portion 641 performs PCI interface control of the PCI bus 611, and has a state machine 653 which performs PCI interface control to extract the read request selected by arbitration from the arbiter 853 when the PCI bus 611 is released, assert the REQ# on the corresponding request line, and transmit the GNT# of the grant line to the corresponding queue.

As shown in FIG. 3, the state machines 861A to 861D within the corresponding read request queues 651A to 651D, upon receiving a new read request from within the PCI device 601, enter a first state of asserting the request with high priority, and upon receiving a retry response from the bridge circuit 602, enter a second state of asserting the request (a request according to a retry response) with low priority. Further, on receiving a grant signal GNT, a state machine initiates a transaction and goes active, and upon completing data transfer returns to the idle state.

Consequently initial read requests are given priority (high priority), read requests can be sent to the bridge circuit 602, and the PCI bus can be utilized effectively, so that overall system throughput can be raised.

The interval (fixed length of time) of read requests according to retry responses from the bridge circuit 602 is set as a request threshold value in the comparators 863A to 863D in the read request queues 651A to 651D. The comparators 863A to 863D compare this value and the count value, and when the count value exceeds the request interval value, can assert a read request for a retry response.

The state machine 653 of the PCI interface portion 641, upon receiving a grant signal GNT# in the idle state, becomes active, and upon either receiving a retry response or detecting completion of data transfer, returns to the idle state.

Figure 4:
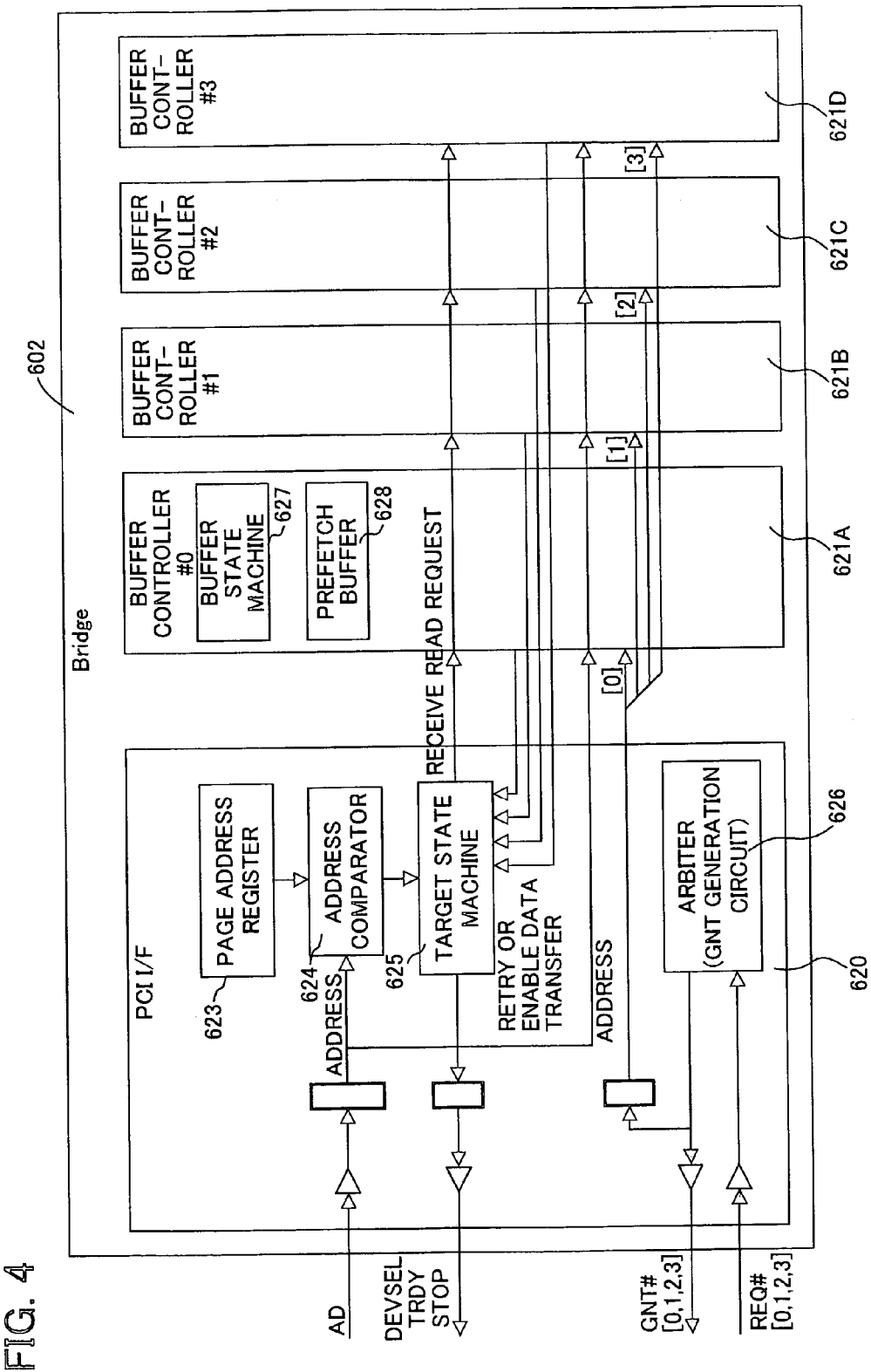
FIG. 4 is a block diagram of the bridge circuit of FIG. 1.
Figure 5:
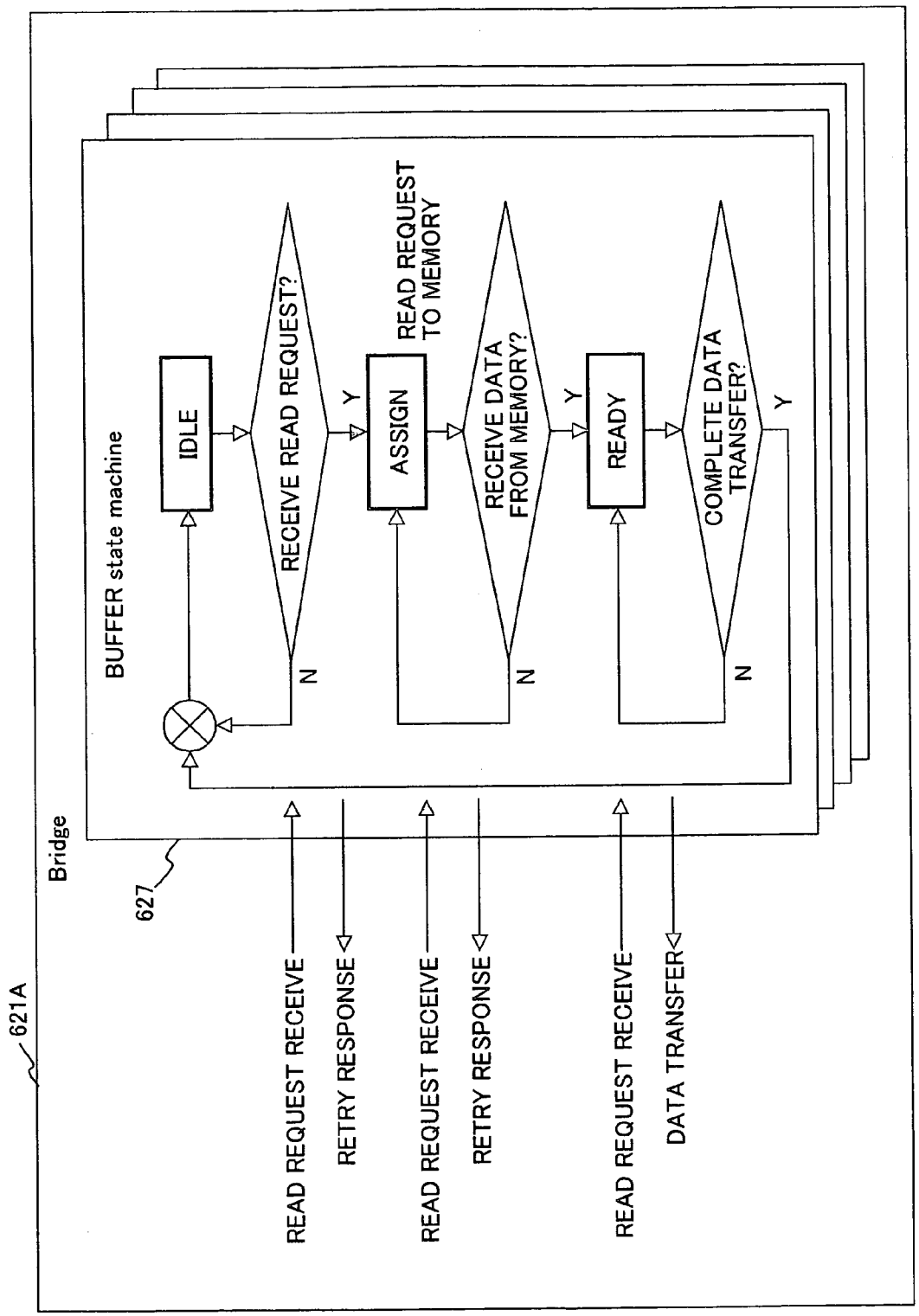
FIG. 5 shows the flow of processing of the buffer state machine shown in FIG. 4.

Next, the bridge circuit 602 is explained using FIG. 4 and FIG. 5. As shown in FIG. 4, the PCI interface portion 620 has a page address register 623, address comparison portion 624, target state machine 625, and PCI arbiter 626. The pre-fetch buffers 621A to 621D each comprise a buffer control portion having a buffer state machine 627 (see FIG. 5) and a pre-fetch buffer 628.

The PCI arbiter 626 receives the REQ# signal from the PCI device and asserts the grant GNT# signal. The PCI device can initiate a transaction only when the grant GNT# signal is received, and so the bridge circuit 602 examines the GNT# signal asserted by the PCI device and can judge which PCI device has initiated the transaction.

The PCI device, upon initiating the transaction, first sends an address to the AD (address data) line of the PCI bus 611, and so the PCI interface portion 620 compares the value stored in the page address register 623 and the received address using the comparator 624. If the addresses match, the target machine 625 is started, and the PCI interface portion 620 notifies the buffer control portions 621A to 621D of receipt of a read request, and transfers the received address.

As shown in FIG. 5, when the state machines 627 of the buffer control portions 621A to 621D judges to receive a read request from the read request reception signal from the PCI interface portion 620 and the GNT signal from the PCI arbiter 626, and when a read request is initially received, or if read data has not been prepared, a retry response is sent. If the read data is prepared in the pre-fetch buffer 628, the target state machine 625 is notified of the fact that data can be transferred, and data is transferred to the PCI interface portion 620.

The target state machine 625 of the PCI interface portion 620 performs a transaction with the PCI bus 611 according to whether the response from the buffer control portion 621A to 621D is a retry response or indicates that data transfer is possible.

PCI Device Memory Read Operation

Figure 6:
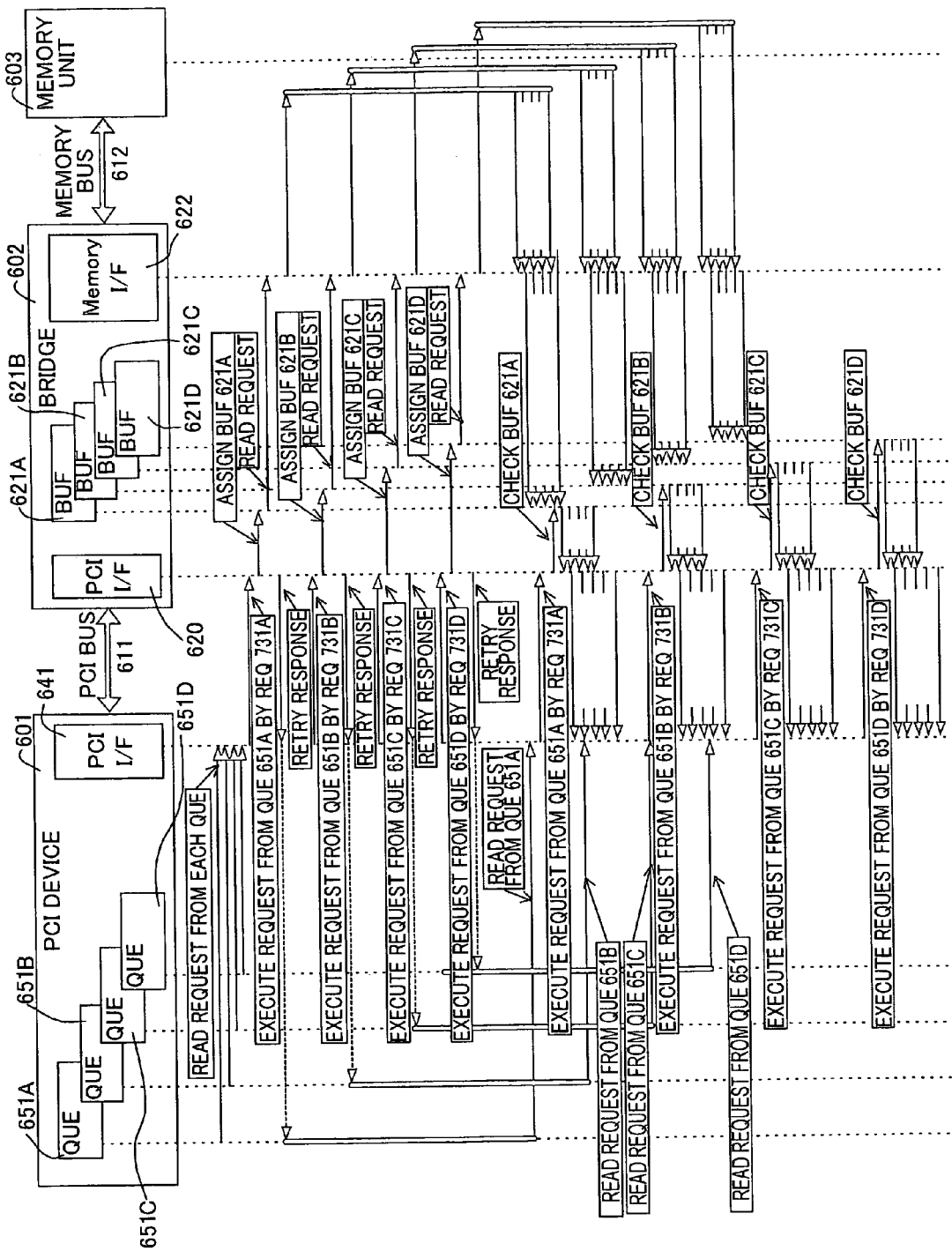
FIG. 6 explains the read request operation of FIG. 1.
Figure 7:
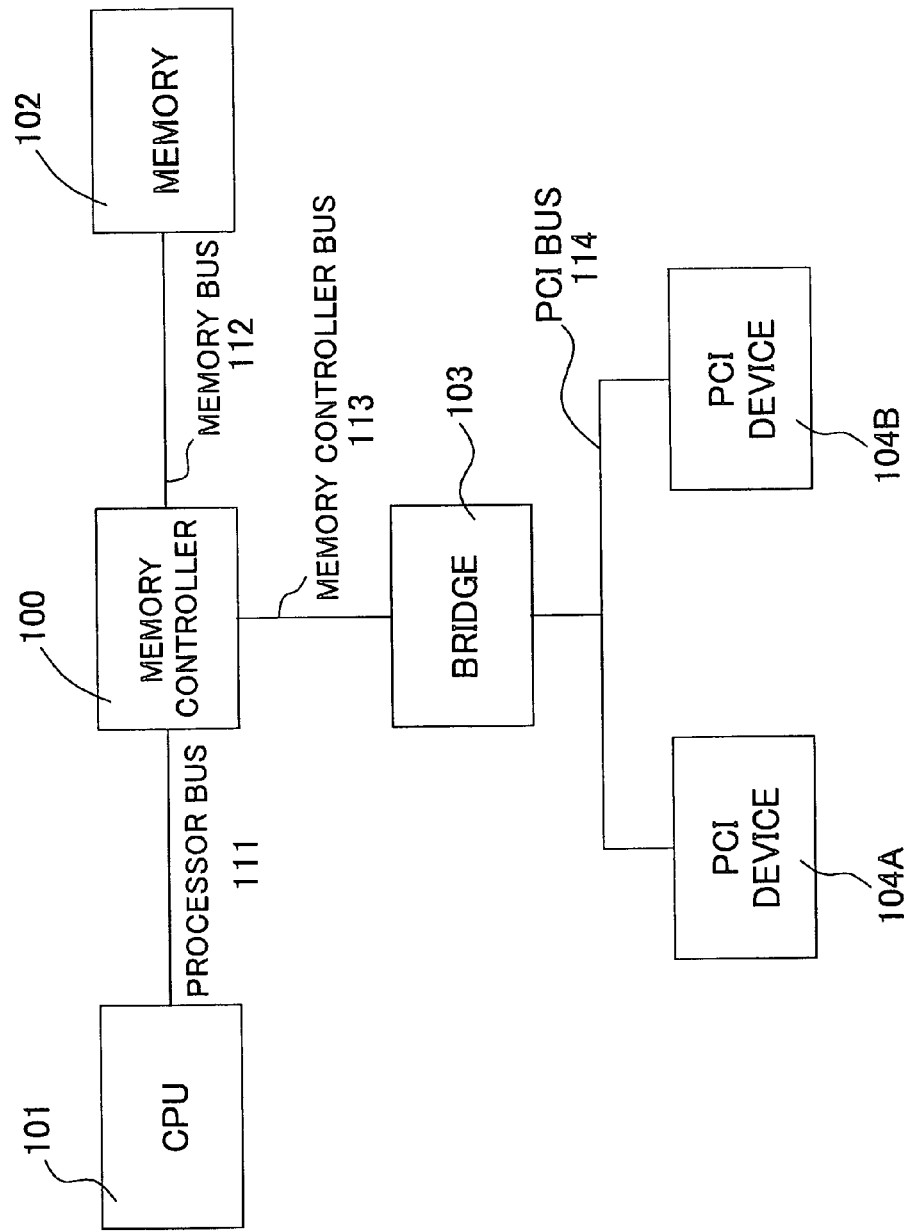
FIG. 7 is a block diagram of a conventional computer system.
Figure 8:
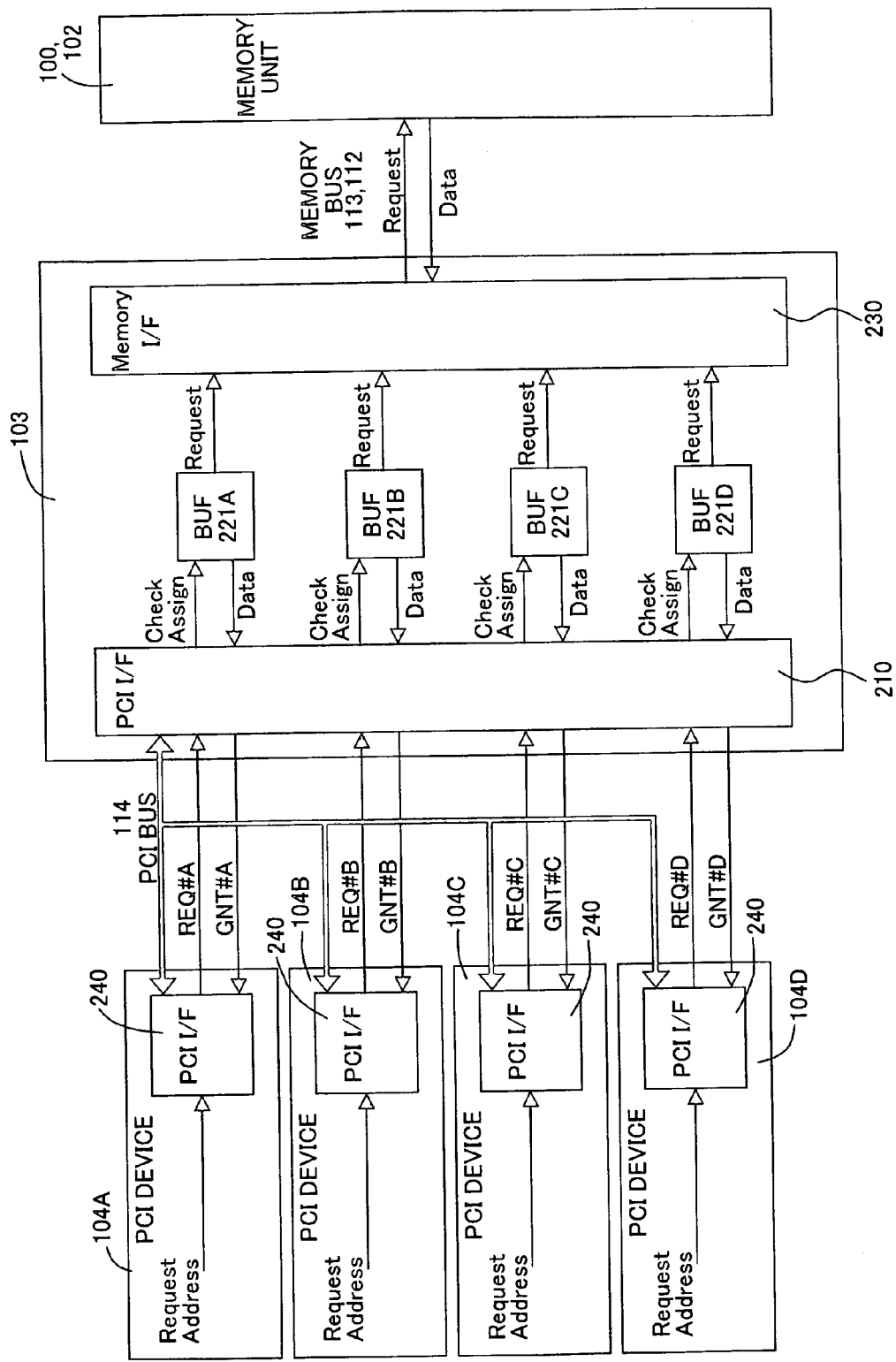
FIG. 8 is a block diagram of a computer system comprising a conventional PCI device.
Figure 9:
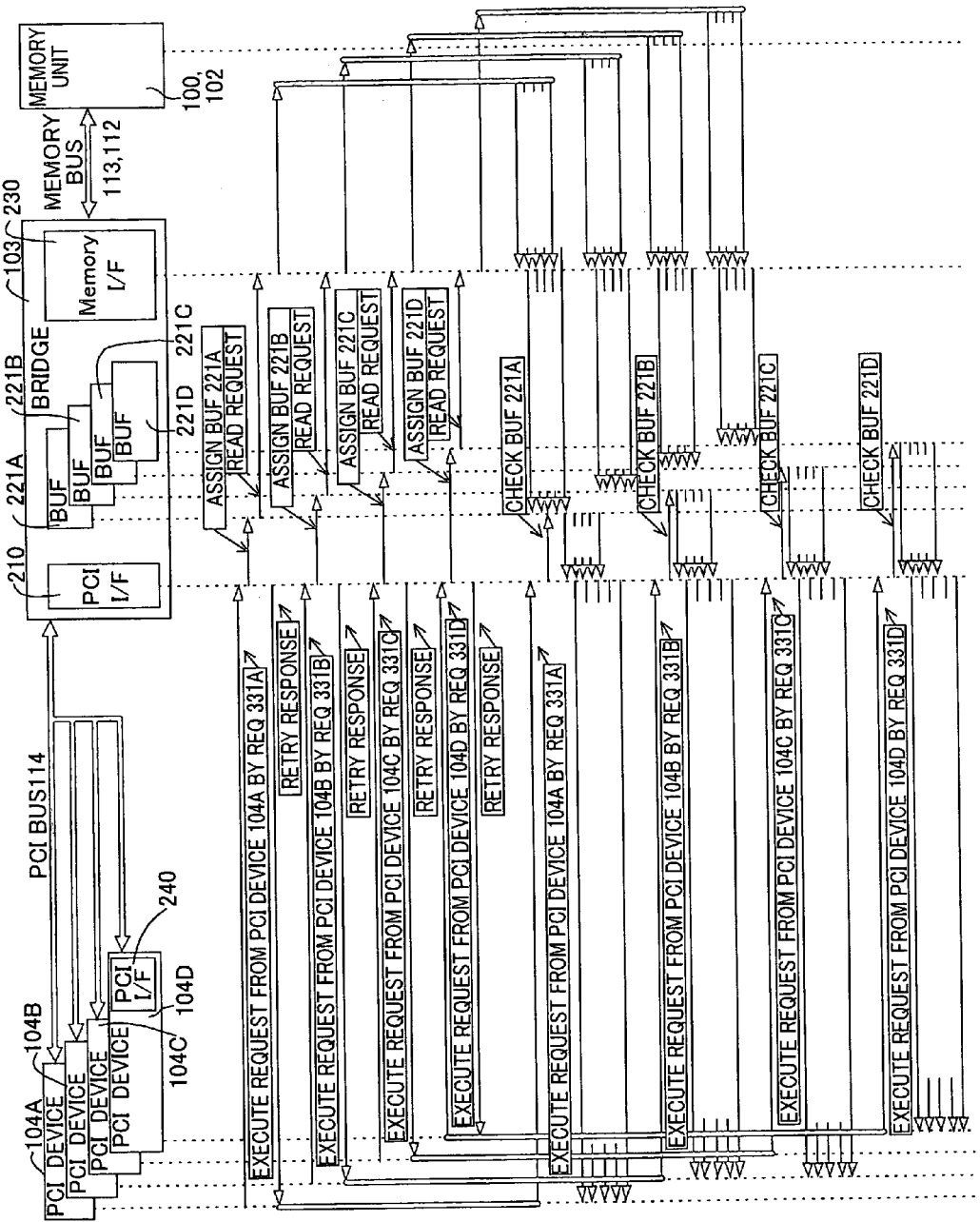
FIG. 9 shows the conventional read request operation sequence.
Figure 10:
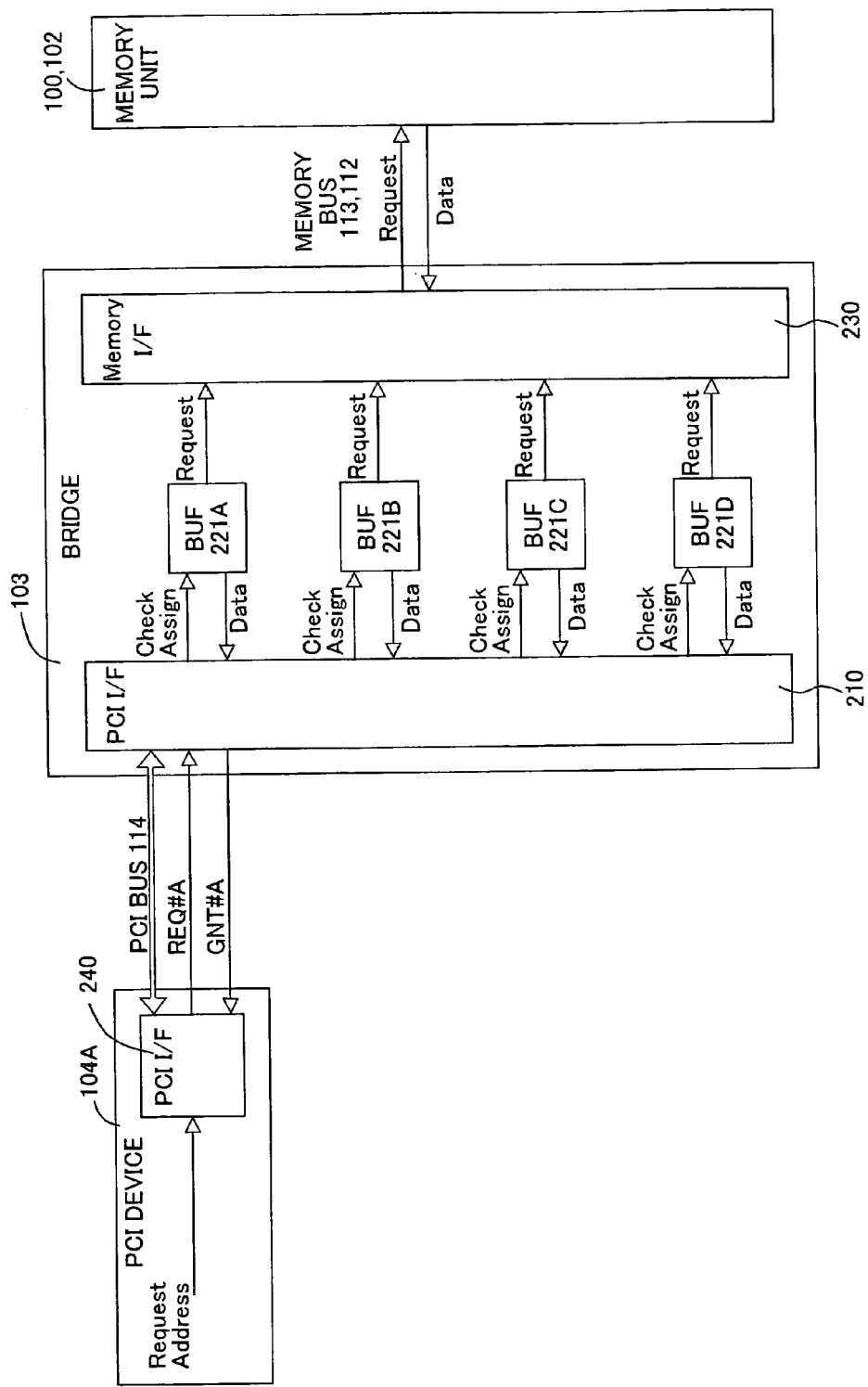
FIG. 10 explains problems with conventional PCI devices.

FIG. 6 shows the sequence of operations when the PCI device 601 executes a memory read request in the computer system of FIG. 1 through FIG. 5; details of these operations are indicated below.

(1) Each read request queue 651A to 651D sends a memory read request.

(2) The PCI interface portion 641 of the PCI device 601 executes the memory read request from the read request queue 651A through the request REQ731A.

(3) The PCI interface portion 620 of the bridge circuit 602 assigns the pre-fetch buffer 621A, sends a retry response to the PCI bus 611, and releases the PCI bus 611.

(4) The pre-fetch buffer 621A sends a read request to perform a memory read to the memory interface portion 622.

(5) The memory interface portion 622 initiates a memory read request transaction with the memory unit 603.

(6) Memory read data is transferred from the memory unit 603 and is stored in the pre-fetch buffer 621A.

The memory read requests of the read request queues 651B to 651D are executed in operations similar to those of (2) through (6). Because normally the time after the memory interface portion 622 of the bridge circuit 602 executes a memory read until the read data is received is extremely long, the operations (2) through (6) for the read requests of each of the read request queues 651A to 651D are performed in parallel with a time difference.

(7) The read request queue 651A sends a memory read request, and the PCI interface portion 641 of the PCI device 601 executes the memory read request through REQ731A.

(8) The PCI interface portion 620 of the bridge circuit 602 confirms the pre-fetch buffer 621A, and initiates transfer of the stored read data to the PCI interface portion 620.

(9) The PCI interface portion 620 of the bridge circuit 602 initiates data transfer of read data to the PCI bus 611.

The read request queues 651A to 651D likewise again execute memory read requests and initiate read data transfer, through operations similar to those of (8) and (9).

In this way, by providing a plurality of read request queues in one PCI device and providing a plurality of REQ/GNT signals corresponding to each read request queue, the plurality of pre-fetch buffers of the bridge circuit can be utilized effectively and the PCI bus can be used effectively, so that overall system throughput is improved.

As explained in FIG. 2, the read request queues comprise state machines 861A to 861D which store the states of the respective requests, a counter which counts the intervals in which the read request queue outputs arbitration requests, comparators which detect when a counter value exceeds a preset value, and a register which holds addresses, commands, and other information.

Hence the interval of read requests for retry responses from the bridge circuit can be set in the comparator of the read request queue as a request interval value, and when the comparator compares this value with the counter value and finds that the counter value has exceeded the request interval value, the read request for a retry response can be asserted. Consequently in the second and subsequent read requests, wasted PCI bus use by the bridge circuit merely to return retry responses can be reduced, and the overall system throughput can be raised.

Further, when a state machine within a read request queue receives a new read request from within the PCI device, a state machine enters first state in which the request is asserted with high priority, and when a retry response is received from the bridge circuit, the state machine enters a second state in which the request is asserted with low priority.

Consequently an initial read request can be given priority when sending a read request to the bridge circuit, and the PCI bus can be utilized effectively, so that overall system throughput can be raised.

Other Embodiments

In the above explanation, the system connected a PCI device having four request queues to a bridge circuit having four pre-fetch buffers; but similar application to a system connected to two PCI devices each having two request queues is possible.

Further, the number of pre-fetch buffers and the number of request queues are not limited to four, and application is possible if there are a plurality of two or more. Further, the above explanation was for a PCI bus, but application to other bus types is also possible.

In the above, this invention was explained through aspects, but the present invention is not limited to the above aspects, and of course comprises various aspects obtained through appropriate modifications within the range within which the objects and advantages of the invention are not lost.

As explained above, as a result of this invention a single bus connection device is provided with a plurality of request queues and with a plurality of request signal outputs and grant signal inputs, so that a single bus connection device can make effective use of the plurality of pre-fetch buffers of a bridge circuit, wasted read requests according to retry responses from the bridge circuit can be reduced, and wasted use of the PCI bus can be decreased. Consequently the data transfer efficiency can be raised, and overall system throughput can be improved.

What is claimed is:

1. A bus connection circuit, which is connected via a bus to a bridge circuit having a plurality of pre-fetch buffers for pre-fetching of data from an external device, and which receives data from said pre-fetch buffers after assertion of a request, comprising:
   a plurality of request queues;
   an arbiter which performs arbitration of the requests of said plurality of request queues; and
   a bus interface portion which outputs request signals indicating allocation of said pre-fetch buffers corresponding to requests arbitrated by said arbiter, and which receives corresponding grant signals from said bridge circuit, said bus interface portion being connected via said bus and a plurality of request lines, corresponding to the allocation of said pre-fetch buffers to said bridge circuit, and outputs respective request signals to said request lines corresponding to said requests arbitrated by said arbiter.

2. The bus connection circuit according to claim 1, wherein said bus interface portion releases said bus according to said request signal upon reception of a retry response from said bridge circuit prompted by said request signal, and outputs to said request line a request signal indicating the allocation of other pre-fetch buffers.

3. The bus connection circuit according to claim 1, further having an internal circuit which issues read requests to said plurality of request queues.

4. The bus connection circuit according to claim 1, wherein said request is a read request to memory via said bridge circuit.

5. The bus connection circuit according to claim 1, wherein said bus is a PCI bus.

6. The bus connection circuit according to claim 2, wherein said request queues give priority to and assert an initial read request over a read request corresponding to said retry response.

7. The bus connection circuit according to claim 2, wherein said request queues have a register which sets a time, from receipt of said retry response until assertion of the read request corresponding to said retry response.

8. A bus connection system comprising:
   a bridge circuit with a plurality of pre-fetch buffers to pre-fetch data from memory; and
   a bus connection circuit, which is connected to said bridge circuit via a bus, and which, after assertion of a request, receives data from said pre-fetch buffers,
   wherein said bus connection circuit comprises:
   a plurality of request queues;
   an arbiter which performs arbitration of the requests of said plurality of request queues; and
   a bus interface portion which outputs request signals indicating the-allocation of said pre-fetch buffers corresponding to requests arbitrated by said arbiter, and which receives corresponding grant signals from said bridge circuit, said bus interface portion being connected via said bus and a plurality of request lines, corresponding to the allocation of said pre-fetch buffers, to said bridge circuit, and outputting request signals to said request line corresponding to said request arbitrated by said arbiter.

9. The bus connection system according to claim 8, wherein said bus interface portion of said bus connection circuit releases said bus according to said request signal upon reception of a retry response from said bridge circuit prompted by said request signal, and outputs to said request line a request signal indicating the allocation of another pre-fetch buffers.

10. The bus connection system according to claim 8, wherein said bus connection circuit further comprises an internal circuit which issues read requests to said plurality of request queues.

11. The bus connection system according to claim 8, wherein said request is a read request to memory via said bridge circuit.

12. The bus connection system according to claim 8, wherein said bus is a PCI bus.

13. The bus connection system according to claim 8, wherein said bridge circuit assigns corresponding pre-fetch buffers in response to said request signals, outputs retry responses to said bus connection circuit, and outputs read requests to said memory.

14. The bus connection system according to claim 9, wherein said request queues of said bus connection circuit give priority to and assert an initial read request over a read request corresponding to said retry response.

15. The bus connection system according to claim 9, wherein said request queues of said bus connection circuit have a register which sets the time from receipt of said retry response until assertion of the read request corresponding to said retry response.

16. The bus connection system according to claim 13, wherein said bridge circuit examines corresponding pre-fetch buffers in response to request signals for said retry responses, and transfers data in said pre-fetch buffers to said bus connection circuit.

* * * * *

UNITED STATES PATENT AND TRADEMARK OFFICE
CERTIFICATE OF CORRECTION

PATENT NO. : 7,124,232 B2
APPLICATION NO. : 10/780607
DATED : October 17, 2006
INVENTOR(S) : Yoshihiko Takeda et al.

It is certified that error appears in the above-identified patent and that said Letters Patent is hereby corrected as shown below:

Column 9, Line 35-36, change "claim 1 ,wherein" to --claim 1, wherein--

Column 9, Line 45, after "system" insert --,--

Column 10, Line 6, change "the-allocation" to --allocation--

Signed and Sealed this

Sixth Day of March, 2007

JON W. DUDAS
*Director of the United States Patent and Trademark Office*